Patented July 13, 1943

2,324,199

UNITED STATES PATENT OFFICE 2,324,199

PREPARATION OF AMMONIUM AND AMINE SALTS OF ACIDIC ORGANIC COMPOUNDS

Richard C. Datin, Petersburg, Va., and Dwight C. Bardwell, Syracuse, N. Y., assignors to The Solvay Process Company, New York, N. Y., a corporation of New York No Drawing. Application August 14, 1939, Serial No. 290,108

5 Claims. (Cl. 260—401)

This invention relates to an improvement in the process for the manufacture of ammonium or organic amine salts of organic compounds which are solids and which contain in their molecules a salt-forming radical of an oxygen-containing polybasic inorganic acid such as a salt forming radical of sulfuric acid (i. e., a sulfonic acid or acid sulfuric acid ester group), phosphoric acid, or thiosulfuric acid. More particularly it relates to an improvement in the process for the manufacture of ammonium or organic amine salts of aliphatic sulfonic acids, particularly aliphatic sulfonic acids containing a long alkyl chain of 8 or more carbon atoms which are adapted for use as detergents and wetting, emulsifying, and the like agents. The invention especially relates to a process for the manufacture of ammonium or organic amine salts of alpha sulfonic acid derivatives of saturated higher fatty acids.

The production of ammonium or organic amine salts of solid organic compounds of the above class frequently presents a difficult problem. For example, in the manufacture of the ammonium salt of an alpha sulfonic acid derivative of a saturated higher fatty acid by dissolving the sulfonation derivative in water and neutralizing the resulting aqueous solution with ammonia, it is necessary to evaporate the solution in order to obtain the ammonium salt in dry form. This evaporation not only involves a considerable expense, but frequently causes deterioration in the quality of the product as evidenced by a darkening in color. The manufacture of organic amine salts of alpha sulfonic acid derivatives of saturated higher fatty acids by dissolving the derivatives in an organic solvent and introducing an amine into the resulting solution has not proved satisfactory because the amine salts are obtained, after evaporation of the solvent, as a dark viscous mass.

Alpha sulfonic acid derivatives of saturated higher fatty acids can be manufactured by a process in which the saturated higher fatty acids are reacted with sulfur trioxide in the presence of liquid sulfur dioxide. At the completion of the sulfonation the liquid sulfur dioxide used as the solvent medium is evaporated off leaving the solid anhydrous alpha sulfonic acid derivative. Because the sulfur dioxide is not completely removed by the evaporation procedure, the sulfonation derivative obtained in this way contains a considerable proportion, e. g., 30 to 60 per cent, of occluded sulfur dioxide. Before neutralizing a sulfonation derivative of this character it had been considered to be necessary to remove the sulfur dioxide by blowing with air, boiling an aqueous solution of the derivative, or stripping an aqueous solution of the derivative with air or steam, or both. The necessity for the removal of sulfur dioxide, therefore, introduced an operating difficulty in the process of manufacturing salts of such derivatives.

The present invention is based upon the discovery that by intimately contacting an acidic organic compound which contains in its molecule a salt-forming radical of an oxygen-containing polybasic inorganic acid in solid form with ammonia or a volatile organic amine under substantially anhydrous conditions, the ammonium or organic amine salt of the compound is formed in a simple and efficient manner. This reaction can be carried out by adding the ammonia or volatile organic amine to the acidic organic compound in the liquid or gaseous state. Thus, ammonia or an organic amine can be added by flashing it into the reaction zone from a vessel containing anhydrous liquid ammonia or liquid amine under high pressure. In this case, a part of the nitrogen base vaporizes and the acidic organic compound is contacted with the ammonia or the amine in both the liquid and gaseous states. As a result of intimately contacting the acidic organic compound with ammonia or a volatile organic amine under substantially anhydrous conditions, the ammonium or organic amine salt is obtained in dry form. The process of the invention is particularly useful for the production of ammonium and organic amine salts of solid sulfonation derivatives (i. e., sulfonic acids or acid sulfuric acid esters) of organic compounds which contain an alkyl group of at least 8, particularly 8 to 24, and preferably 12 to 18 carbon atoms. An especially important application of the process is in the manufacture of ammonium or amine salts of alpha-sulfonic acid derivatives of saturated higher fatty acids. By the use of the present process, the necessity for dissolving the derivative in water or other solvent, neutralizing the resulting solution, and evaporating the solution to dryness, which, as noted above, often causes discoloration of the product, is avoided.

The process of the present invention has been found to be particularly valuable for the preparation of ammonium or organic amine salts of sulfonation derivatives prepared by sulfonations carried out in the presence of liquid sufur dioxide as the solvent medium. Because sulfonation derivatives prepared in this way ordinarily contain occluded sulfur dioxide, their neutralization presents a special problem, as discussed above. It has been found, for example, that by intimately contacting anhydrous ammonia with the alpha sulfonic acid derivative of a saturated higher fatty acid separated from a sulfonation reaction mixture having liquid sulfur dioxide as the solvent medium, the ammonium salt is formed in an efficient manner. At the same time, substantially all of the sulfur dioxide is removed from the product, apparently as a volatile compound formed by interaction of the ammonia and sulfur dioxide.

In carrying out the present process for the preparation of the ammonium salt of an alpha sulfonic acid derivative of a saturated higher fatty acid, of which stearic acid is a preferred example, one can proceed as follows: The sulfonation derivative used as starting material is preferably prepared by a procedure involving acting on the fatty acid with sulfur trioxide in the presence of liquid sulfur dioxide and removing the bulk of the sulfur dioxide, for example, by substantially complete evaporation. The solid sulfonation derivative containing residual sulfur dioxide is introduced into a closed tumbling drum of conventional design and with the drum in operation is contacted with an amount of anhydrous ammonia in excess of that theoretically required to form the ammonium salt. During the operation of the drum, the sulfonation derivative is agitated and is brought into intimate contact with the ammonia. The ammonia may be introduced entirely as a gas or may be flashed into the drum from a vessel containing anhydrous liquid ammonia under high pressure, whereby it is contacted with the sulfonation derivative partly in the liquid and partly in the gaseous state. The ammonia may be passed continuously into one end of the drum while removing gaseous reaction products at the other end.

In the researches leading to the development of the present invention it was determined that considerable heat is evolved during the neutralization reaction. Also, it was found that the sulfonation derivative of a saturated higher fatty acid in contact with sulfur dioxide tends to decompose at temperatures much above 50° C., and that the ammonium salt becomes unstable at temperatures above 150° C. Hence, in order to obtain products of satisfactory color it is advisable to control the temperature of the reaction. It has been found that this can be done by controlling the rate of addition of the ammonia and/or by using a mixture of ammonia and air rather than pure ammonia. This control may also be effected by flashing in the ammonia as above described. The vaporization of the ammonia takes up considerable heat and thereby cools the reaction mixture. The temperatures at which the preparation of the ammonium salt of an alpha sulfonic acid derivative of a saturated higher fatty acid is preferably carried out will vary depending upon the particular derivative treated, the type of apparatus employed, the amount of sulfur dioxide present, and other factors. In general, when the derivative contains 30 to 60 per cent of sulfur dioxide it is advisable to control the reaction so that the temperature does not rise above 50° C. until the formation of the ammonium salt is substantially complete. For example, the reaction is preferably begun at room temperature; i. e., about 20° C. However, toward the end of the neutralization it is advisable to bring the ammonium salt to a temperature of about 120° C., by applying external heat, if necessary, in order to reduce the sulfite sulfur in the product to a negligible amount.

The gaseous products leaving the reaction chamber are composed principally of ammonia and sulfur dioxide which apparently are in complex chemical combination. The ammonia can be recovered by passing the products through a sulfuric acid solution. The ammonium sulfate, which is formed in this way, can be used, for example, as a filler in the making up of a finished detergent product containing the ammonium salt of the alpha sulfonic acid derivative of the saturated higher fatty acid. The sulfur dioxide is not absorbed in the sulfuric acid and may be recovered by condensation and reused as the solvent medium in a subsequent sulfonation procedure.

In preparing ammonium or organic amine salts of alpha sulfonic acid derivatives of saturated higher fatty acids prepared by sulfonations in the presence of liquid sulfur dioxide it is sometimes of advantage to remove substantially all of the sulfur dioxide before contacting the derivative with ammonia or an amine. This removal can be effected after separating the derivative from the bulk of the sulfur dioxide by stripping the derivative with an inert gas such as nitrogen or air, or by subjecting it to evacuation. When substantially free from sulfur dioxide the sulfonation derivative is less sensitive to high temperatures; consequently, the neutralization may be carried out at higher temperatures without the formation of colored impurities. For example, temperatures in the neighborhood of 100° C. can be used, although the process is preferably carried out at lower temperatures.

As already stated, the present process is particularly valuable when used for the preparation of ammonium or organic amine salts of alpha sulfonic acid derivatives of saturated higher fatty acids. As examples of such acids, in addition to stearic acid referred to above, myristic acid, palmitic acid, arachidic acid, behenic acid, and lignoceric acid may be mentioned. The process may also be used for the preparation of ammonium or organic amine salts of other solid, acidic organic compounds which contain in their molecules a salt-forming radical of an oxygen-containing polybasic inorganic acid, particularly solid, acidic organic compounds of this class which contain an alkyl radical of at least 8, and preferably 12 to 18 carbon atoms. For example, the process may be used for the production of the ammonium and organic amine salts of the sulfuric acid, thiosulfuric acid, and phosphoric acid derivatives of higher aliphatic alcohols, ketones corresponding to the above-named fatty acids, alkyl aromatic compounds, and olefines. The salt-forming acid radicals in these compounds may be, for example, sulfonic acid, acid sulfuric acid ester, acid thiosulfuric acid ester, phosphonic acid, and acid phosphoric acid ester groups. Specific examples of such compounds are the acid sulfuric acid ester of technical lauryl alcohol; the sulfonation derivative of cetene which contains a hydroxyl group and a sulfonic acid group; the sulfonation derivative of myristone, which contains a sulfonic acid group attached to an alpha carbon atom; esters of higher fatty acids with lower sulfo-aliphatic alcohols such as the sulfoethyl ester of oleic acid; long-chain alkyl aromatic sulfonic acids such as dodecyl benzene sulfonic acid; stearyl acid phosphate; and heptadecyl acid thiosulfate. The ammonium and organic amine salts of the above-named compounds are valuable detergents and/or wetting, emulsifying, and the like agents.

In the above description, particular stress has been laid upon the preparation of ammonium salts, since the present process is especially valuable for the preparation of such salts. The salts of the sulfonation derivatives with volatile organic amines, however, can be prepared in substantially the same way in accordance with the process of the invention. Examples of suitable volatile amines for use in the process are methylamine, ethylamine, propylamine, butylamine, dimethylamine, diethylamine, trimethylamine, triethylamine, methyl-ethylamine, dimethyl-ethylamine, and commercial mixtures of these with one another and with ammonia.

While a tumbling drum is a convenient apparatus in which to carry out the neutralization reaction, it will be understood that other kinds of reaction chambers can be used. In order to effect satisfactory completion of the reaction, however, it is advisable to agitate the sulfonation derivative continuously or from time to time so as to bring it into intimate contact with the ammonia or organic amine.

Since certain changes may be made in the above-described process without departing from the scope of the invention it is intended that the description shall be interpreted as illustrative and not in a limiting sense.

We claim:

1. The process for the preparation of a salt of an alpha sulfonic acid derivative of a saturated higher fatty acid which comprises intimately contacting the sulfonic acid derivative in the solid form, and containing admixed therewith a substantial proportion of sulfur dioxide, with a neutralizing agent selected from the group consisting of ammonia and volatile amines under substantially anhydrous conditions, and maintaining the temperature below 50° C. until formation of a salt of the sulfonic acid derivative is substantially complete.

2. The process for the preparation of an ammonium salt of an alpha sulfonic acid derivative of a saturated higher fatty acid which comprises intimately contacting the sulfonic acid derivative in the solid form, and containing admixed therewith 30 to 60 per cent by weight of sulfur dioxide, with gaseous ammonia under substantially anhydrous conditions, and maintaining the temperature below 50° C. until formation of the ammonium salt of the sulfonic acid derivative is substantially complete.

3. In the process for the preparation of the ammonium salt of an alpha sulfonic acid derivative of a saturated higher fatty acid prepared by sulfonating the saturated higher fatty acid in a sulfonation mixture containing liquid sulfur dioxide as the solvent medium, and removing the bulk of the liquid sulfur dioxide to yield an alpha sulfonic acid derivative in solid form containing admixed therewith a substantial proportion of sulfur dioxide, the improvement which comprises agitating the solid alpha sulfonic acid derivative containing the sulfur dioxide while introducing into contact therewith ammonia at a rate such that the temperature of the reaction mixture does not rise above 50° C. until the formation of the ammonium salt is substantially complete.

4. In the process for the preparation of the ammonium salt of an alpha sulfonic acid derivative of a saturated higher fatty acid prepared by sulfonating the saturated higher fatty acid in a sulfonation mixture containing liquid sulfur dioxide as the solvent medium, and removing the bulk of the liquid sulfur dioxide to yield an alpha sulfonic acid derivative in solid form containing admixed therewith 30 to 60 per cent by weight of sulfur dioxide, the improvement which comprises agitating the solid alpha sulfonic acid derivative containing the sulfur dioxide while introducing into contact therewith gaseous ammonia at a rate such that the temperature of the reaction mixture does not rise above 50° C. until the formation of the ammonium salt is substantially complete, and then controlling the temperature of the reaction mixture so that a final temperature of about 120° C. is reached.

5. In the process for the preparation of the ammonium salt of the alpha sulfonic acid derivative of stearic acid prepared by sulfonating stearic acid in a sulfonation mixture containing liquid sulfur dioxide as the solvent medium, and removing the bulk of the liquid sulfur dioxide to yield an alpha sulfonic acid derivative of stearic acid in solid form containing admixed therewith a substantial proportion of sulfur dioxide, the improvement which comprises agitating the solid alpha sulfonic acid derivative containing the sulful dioxide while introducing into contact therewith gaseous ammonia at a rate such that the temperature of the reaction mixture does not rise above 50° C. until the formation of the ammonium salt is substantially complete, and then controlling the temperature of the reaction mixture so that a final temperature of about 120° C. is reached.

RICHARD C. DATIN.
DWIGHT C. BARDWELL.